(12) United States Patent
Jia et al.

(10) Patent No.: US 8,380,960 B2
(45) Date of Patent: Feb. 19, 2013

(54) DATA ALLOCATION AND REPLICATION ACROSS DISTRIBUTED STORAGE SYSTEM

(75) Inventors: Hongzhong Jia, Mountain View, CA (US); Moises Goldszmidt, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1037 days.

(21) Appl. No.: 12/264,274

(22) Filed: Nov. 4, 2008

(65) Prior Publication Data

US 2010/0115216 A1      May 6, 2010

(51) Int. Cl.
*G06F 12/02*     (2006.01)

(52) U.S. Cl. ......... 711/170; 709/214; 711/148; 718/104

(58) Field of Classification Search ................... None
See application file for complete search history.

(56) References Cited

U.S. PATENT DOCUMENTS

| | | | |
|---|---|---|---|
| 5,216,593 A | 6/1993 | Dietrich et al. | |
| 5,345,584 A | 9/1994 | Hill | |
| 6,374,227 B1 | 4/2002 | Ye | |
| 6,526,420 B2 | 2/2003 | Borowsky et al. | |
| 7,007,150 B2 * | 2/2006 | Valentin et al. | 711/170 |
| 7,085,837 B2 | 8/2006 | Kimbrel et al. | |
| 7,197,618 B2 | 3/2007 | M'Zoughi et al. | |
| 7,392,360 B1 * | 6/2008 | Aharoni et al. | 711/170 |
| RE40,521 E * | 9/2008 | Binzinger | 711/162 |
| 7,426,570 B2 | 9/2008 | Andrzejak et al. | |
| 7,587,570 B2 * | 9/2009 | Sarkar et al. | 711/170 |
| 2008/0134193 A1 | 6/2008 | Corley et al. | |

OTHER PUBLICATIONS

Brunstrom, et al., "Experimental Evaluation of Dynamic Data Allocation Strategies in a Distributed Database with Changing Workloads", Technical Report: TR-95-2, Year of Publication: 1995, 16 Pages.
Laoutaris, et al., "On the Optimization of Storage Capacity Allocation for Content Distribution", Dated: Dec. 18, 2003, pp. 1-27.

* cited by examiner

*Primary Examiner* — Gary Portka
(74) *Attorney, Agent, or Firm* — Microsoft Corporation (57) ABSTRACT

In a distributed storage system such as those in a data center or web based service, user characteristics and characteristics of the hardware such as storage size and storage throughput impact the capacity and performance of the system. In such systems, an allocation is a mapping from the user to the physical storage devices where data/information pertaining to the user will be stored. Policies regarding quality of service and reliability including replication of user data/information may be provided by the entity managing the system. A policy may define an objective function which quantifies the value of a given allocation. Maximizing the value of the allocation will optimize the objective function. This optimization may include the dynamics in terms of changes in patterns of user characteristics and the cost of moving data/information between the physical devices to satisfy a particular allocation.

20 Claims, 7 Drawing Sheets

DATA ALLOCATION AND REPLICATION ACROSS DISTRIBUTED STORAGE SYSTEM

BACKGROUND

A distributed storage system has multiple servers. Each server may be a single computer, part of a computer (e.g., a partition on the computer's attached storage), several computers cooperating, or some combination of these (e.g., a collection of three distinct partitions on three distinct computers might constitute a single server).

Data centers and web services, such as mail services, use a distributed storage system. A large number of data items, such as data pertaining to users of a data center or a mail service, may be stored on the servers or other storage nodes in the distributed storage system. The allocation of users and their associated data should be distributed across the storage system in order to optimize performance, maximize capacity, ensure reliability (through replication), and in general satisfy the policies of the data center. This is difficult because disks used for storage are organized in a distributed way and are heterogeneous in terms of capacity and performance characteristics. Also, users differ in their behaviors and usage of the service, such as likely hours of operation, capacity utilization, etc. Finally, optimal allocation of users and their associated data is also difficult because users may be added or removed from a data center or web service and users may change their patterns of utilization, for example. Other requirements on allocations of users, such as allocations based on storages near the users, are similarly difficult.

SUMMARY

In a distributed storage system such as those in a data center or web based service, user characteristics and characteristics of the hardware (such capacity and throughput) impact the performance of the system. In such systems, an allocation is a mapping from the user to the physical storage devices where data/information pertaining to the user will be stored. Policies regarding quality of service (e.g., response time) and reliability including replication of user data/information may be provided by the entity managing the system. A policy may define an objective function which quantifies the value of a given allocation. Maximizing the value of the allocation will optimize the objective function. This optimization may include the dynamics in terms of changes in patterns of user characteristics and the cost of moving data/information between the physical devices to satisfy a particular allocation. In an implementation, a policy may be to equalize the performance (in terms of throughput or response time) in which case an allocation that balances the tradeoffs between the user's characteristics and the hardware characteristics of the system will be optimal.

The allocation of users and their data may be balanced across storage in a distributed storage system. Characteristics of each user may be determined, as may characteristics of the distributed storage system. An effect that the characteristics of each user have on the characteristics of the distributed storage system may be determined and used in the generation of a user assignment plan. The user assignment plan may map each user to one of the storage nodes of the distributed storage system. The users and their data may be moved based on the user assignment plan.

In an implementation, future characteristics of the users may be forecast and the user assignment plan may be further based on the forecasted future characteristics of the users.

In an implementation, the characteristics of each user may comprise an account size, an account size growth rate, an average daily traffic generation, a dynamic daily traffic generation pattern, and/or a registration date. The characteristics of the distributed storage system may comprise a performance and/or a capacity of the each of the storage nodes of the distributed storage system.

In an implementation, an objective of the distributed storage system may be obtained, and a function directed to meeting the objective and any constraints regarding the distributed storage may be determined. The user assignment plan may be based on the function directed to meeting the objective.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
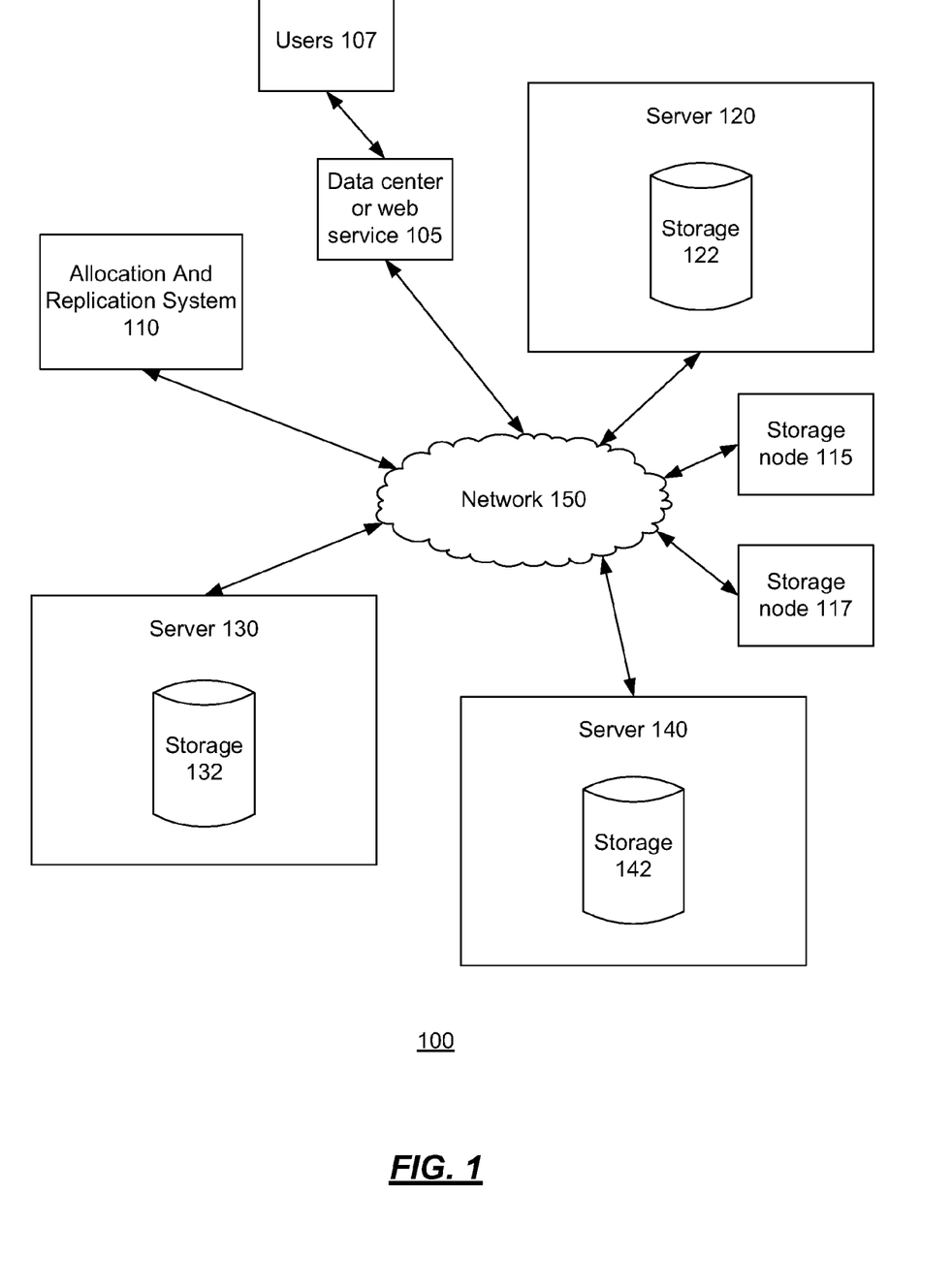
FIG. 1 is a block diagram of an implementation of a system comprising a distributed storage system with an allocation and replication system.

FIG. 1 is a block diagram of an implementation of a system 100 comprising a distributed storage system that comprises servers 120, 130, 140, with an allocation and replication system 110. The distributed storage system may be used by a data center or a web service 105 such as a mail service, for example. The servers 120, 130, 140 and the allocation and replication system 110 may be connected through a communications network 150, such as a local area network (LAN) or wide area network (WAN), for example. The servers 120, 130, 140 and the allocation and replication system 110 can communicate with each other by sending and receiving messages over the communications network 150. Any distributed storage system with any number of servers and/or other nodes, such as storage nodes 115, 117, may be used with the techniques described herein.

The servers 120, 130, 140 comprise storage 122, 132, 142, respectively, and thus may be considered to be storage nodes in an implementation. The storage may comprise any type of storage device(s), such as one or more disks. Data pertaining to a data center or a web service 105 may be stored on the storage 122, 132, 142. Such data may comprise data pertaining to users 107 of the data center or the web service 105. Although only three servers 120, 130, 140 are shown in FIG. 1, any number of servers may be connected to the communications network 150, to the allocation and replication system 110, and to each other. An example computer which may act as a server is described with respect to FIG. 7.

One or more additional storage nodes 115, 117 may be provided in the system 100 and may be connected to the communications network 150, to the allocation and replication system 110, to the servers 120, 130, 140, and to each other. Like the storage on the servers, the storage nodes 115, 117 may store data pertaining to users 107 of a data center or a web service 105. Although only two storage nodes 115, 117 are shown in FIG. 1, any number of storage nodes may be used.

As described further herein, the allocation and replication system 110 may balance the allocation of user data across the storage of the servers 120, 130, 140 and/or other storage nodes 115, 117 in the system 100. The data may be balanced by moving or replicating the data from one storage device to another storage device (e.g., from storage on one server to storage on another server, from one storage node to another storage node, etc.). Alternatively, another allocation, such as a non-balanced allocation, may be desired or predetermined and achieved by the allocation and replication system 110. The allocation and replication system 110 as described further herein may be implemented on any computer such as that described with respect to FIG. 7, for example.

User characteristics and characteristics of the hardware (e.g., hardware heterogeneity) that may impact storage performance and capacity may be determined. A function directed to one or more objectives (i.e., an objective function) may be used to quantify the current balance state of the storage in terms of the user characteristics and the characteristics of the hardware (e.g., the servers 120, 130, 140 and the storage 122, 132, 142). The objective function may be minimized with additional constraints imposed by distributed storage system policies. Minimization of the objective function and the constraints may be used to determine which data should be moved or replicated, where the data should be moved or replicated to, and how the data should be moved or replicated (e.g., in which order, using a particular technique, etc.).

Figure 2:
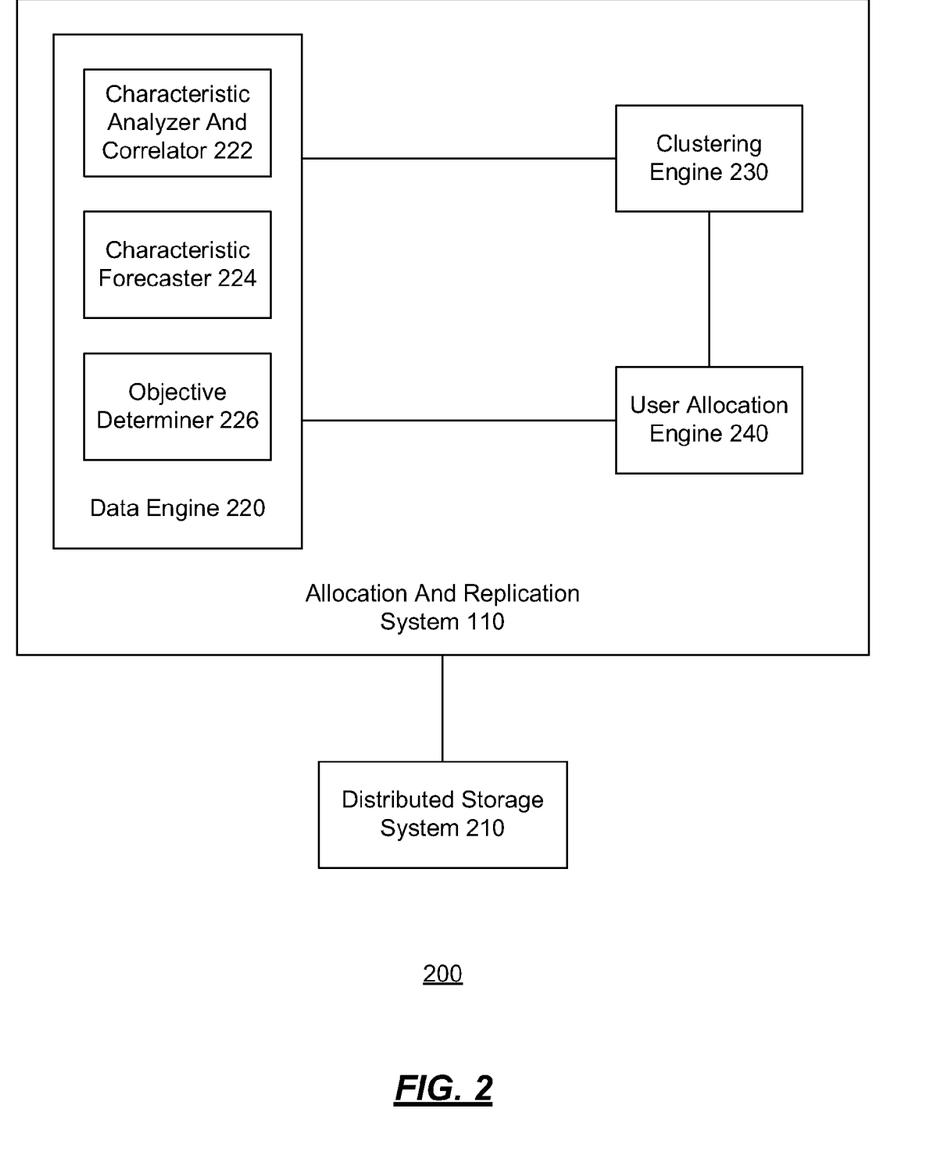
FIG. 2 is a block diagram of an implementation of a system comprising an allocation and replication system with a distributed storage system.

FIG. 2 is a block diagram of an implementation of system 200 comprising an allocation and replication system 110 with a distributed storage system 210. The allocation and replication system 110 may be in communication with the distributed storage system 210 via a communications network, such as the communications network 150 described with respect to FIG. 1.

The allocation and replication system 110 may comprise a data engine 220 that obtains and analyzes data from users and the distributed storage system 210, forecasts future characteristics of users, and determines one or more objectives that may be met in the allocation and replication of data in the distributed storage system 210.

The data engine 220 may comprise a characteristic analyzer and correlator 222, a characteristic forecaster 224, and an objective determiner 226. The characteristic analyzer and correlator 222 may obtain and analyze the characteristics of each user as well as the characteristics of user populations. Such characteristics may include, in an implementation, the location of the user, age and gender of the user, hobby of the user, account size, account size growth rate, average daily traffic generation, a dynamic daily traffic generation pattern, and/or registration date, etc.

The characteristic analyzer and correlator 222 may obtain and analyze the characteristics of the distributed storage system 210, such as performance and capacity of the distributed storage system 210 (e.g., performance and capacity of the servers and/or storage nodes in the distributed storage system). Performance may include, in an implementation, input/output (IO) processing capability, fault tolerance, failure rate, controller speed, etc. of each server and/or storage node in the distributed storage system 210. Capacity may be based on volume of the disks and the number of disks at each server and/or storage node.

In an implementation, the characteristic analyzer and correlator 222 may correlate the user characteristics to the characteristics of the distributed storage system 210. Certain characteristics of the users play a significant role in determining the performance and capacity of the storage of each server or storage node. For example, the account size of a user determines how much the storage capacity is consumed by the user, and the traffic amount generated by a user at a certain time point determines how the storage IO is used. The characteristic analyzer and correlator 222 may determine the determinant user characteristics that impact the storage performance and capacity of the servers and storage nodes in the distributed storage system 210.

The data engine 220 may comprise a characteristic forecaster 224 which may predict future characteristics of users based on the user characteristics obtained by the characteristic analyzer and correlator 222. The characteristic forecaster 224 may use probability theory, time series analysis, stochastic theory, etc. depending on the implementation.

An objective determiner 226 may be comprised within the data engine 220 and may obtain or determine one or more performance and/or capacity objectives that may be met with respect to the distributed storage system 210. In an implementation, the objectives may be obtained from storage and/or provided by a system administrator or other user, for example. The objective(s) may depend on an application of the distributed storage system. For example, the objectives may be to maintain a balanced storage capacity utilization and IO utilization across the servers and/or storage nodes; to accommodate the maximal number of users in each server or storage node with a performance threshold; and/or to maintain a minimal data loss during a multiple server or storage node outage.

The allocation and replication system 110 may comprise a clustering engine 230. In an implementation, the clustering engine 230 may categorize the users into different clusters based on their characteristics that impact the performance and capacity of the distributed storage system 210. In an implementation, each characteristic can be considered as a dimension and multiple characteristics can be considered as a multi-dimensional space. Each user with various characteristics corresponds to one point in the multi-dimensional space. Each dimension in the space can be divided into segments and a number of multi-dimensional cubes (or hypercubes) may be obtained. There can be various ways to divide the space, depending on the specific policy and a distance score that may be considered relevant. Any clustering technique(s) may be used. The users in each hypercube can be considered as a user cluster with homogeneous characteristics or a parametric distribution may be fitted. The value of the each characteristic for the user cluster can be represented by using any well known summarization statistics (e.g., mean, median, quartiles, etc.).

The allocation and replication system 110 may comprise a user allocation engine 240. The user allocation engine 240 may determine a user assignment plan that assigns the users and their data to particular storage to achieve an objective, such as a balanced allocation. The user allocation engine 240 may determine a user and data moving plan that provides user and data moves (e.g., via replication) to achieve the user assignment plan. In an implementation, the user allocation engine 240 may determine the minimum number of user and data moves to balance the storage devices (e.g., the servers and/or storage nodes and/or their disks in the distributed storage system) and to achieve a balanced allocation. In another implementation, the user allocation engine 240 may determine the fastest way to move user data to achieve another allocation, such as a non-balanced though desired allocation.

Figure 3:
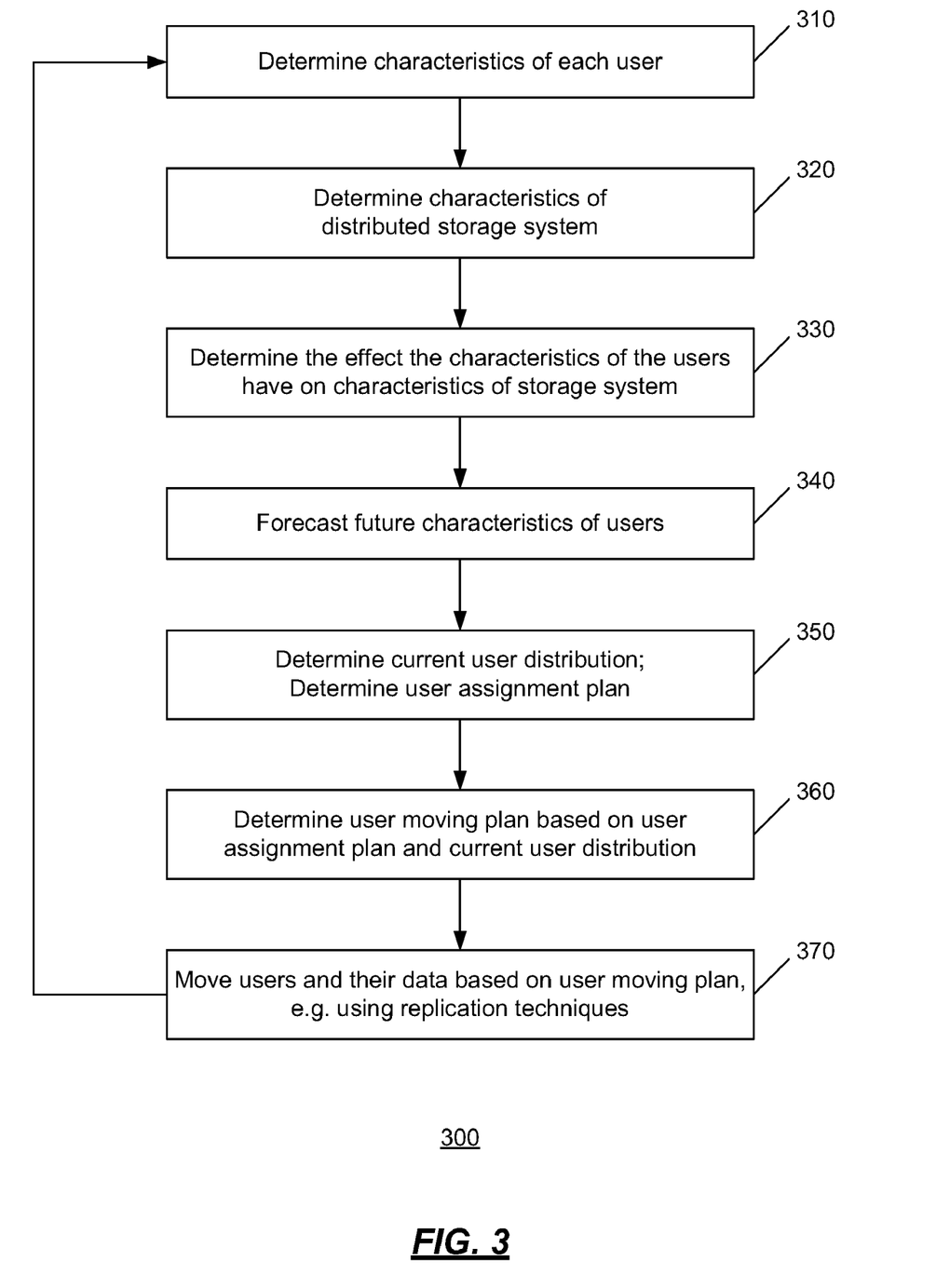
FIG. 3 is an operational flow of an implementation of a method of allocating and replicating data across a distributed storage system.

FIG. 3 is an operational flow of an implementation of a method 300 of allocating and replicating data across a distributed storage system. At 310, characteristics may be determined of users whose data is stored in the distributed storage system e.g., each user with respect to a data center or web service. Additionally or alternatively, in an implementation, characteristics of a user population may be determined.

In an implementation, each user may be represented as a multi-variate vector having variables directed to characteristics of the user. For example a user may be represented as u[i]=(country, age, gender, hobby, account size, account size growth rate, average daily traffic generation, a dynamic daily traffic generation pattern, and/or registration date, etc). The user characteristic data may include static data (e.g., age, gender, etc.) and dynamic data (e.g., account size, growth rate, average daily traffic, etc). The dynamic data may be monitored on a regular basis (e.g., periodically, such as hourly, daily, weekly, etc.) for trending and statistical analysis.

At 320, characteristics of the distributed storage system may be determined. Characteristics may be directed to the performance and capacity of the distributed storage system and its servers and/or storage nodes. Different storage nodes and servers may have different performance standards including IO processing capability, fault tolerance, failure rate, controller speed, etc. Furthermore, different storage nodes and servers may have different storage capacities due to the volume and number of disks, for example.

The effect that the characteristics of the users have on the characteristics of the distributed storage system may be determined at 330. In an implementation, the user characteristics may be correlated to the storage performance and capacity. For a web service such as a mail service or a data center, the distributed storage system may use its servers or other storage nodes to accommodate the users, process the user traffic, and store users' data. The performance (e.g., response time to the data access requests) of the storage of each server or storage node may be determined by the type of server or storage node and how many users are hosted by the server or storage node. The capacity of each storage node or server is a constraint in that the total data stored in the storage node or server cannot be more than the available capacity.

At 340, future characteristics of the users may be forecasted. Based on the characteristics of the users and the user populations that were determined at 310, future characteristics of the users may be forecasted using any known technique(s) such as probability theory, time series analysis, stochastic theory, etc. Based on the characteristics of the distributed storage system that were determined at 320, predictions or estimates (including errors and variance, example) may be made as to how the users may impact the distributed storage system's performance and capacity in the future.

At 350, the current user distribution on the distributed storage system may be determined and a user assignment plan may be determined that maps each user to storage on a server or other storage node in the distributed storage system. In an implementation, the user assignment plan may be determined to balance disk IO traffic processing capability and storage consumption across the storage of the distributed storage system. As described further herein, one or more functions may be developed and solved to determine a user assignment plan.

At 360, a user moving plan may be determined based on the user assignment plan and the current user distribution. The user moving plan may provide information as to how to move the users and their data from their current location to the location of the user assignment plan. The user moving plan may minimize the number of moves that are to be taken to achieve the user assignment plan. The current user distribution across the servers and other storage nodes may be taken as a starting point and a user and data distribution based on the user assignment plan may be taken as the destination. As described further herein, one or more functions may be developed and solved to determine a user moving plan. At 370, the users (e.g., the data pertaining to the users) may be moved based on the user moving plan. Such movement may be performed using replication techniques.

Processing may continue at 310 as the data of the users (e.g., usage statistics and other characteristics) may be dynamically monitored and maintained to provide a dynamic balancing of an allocation of the users and their data in the distributed storage system. As each user's usage evolves, re-balancing using allocation and replication may be implemented. Additionally, a user may be added to a server or a storage node. The data of the user may be considered with processing continuing at 310, leading to a re-balancing of users and their data in an implementation.

Figure 4:
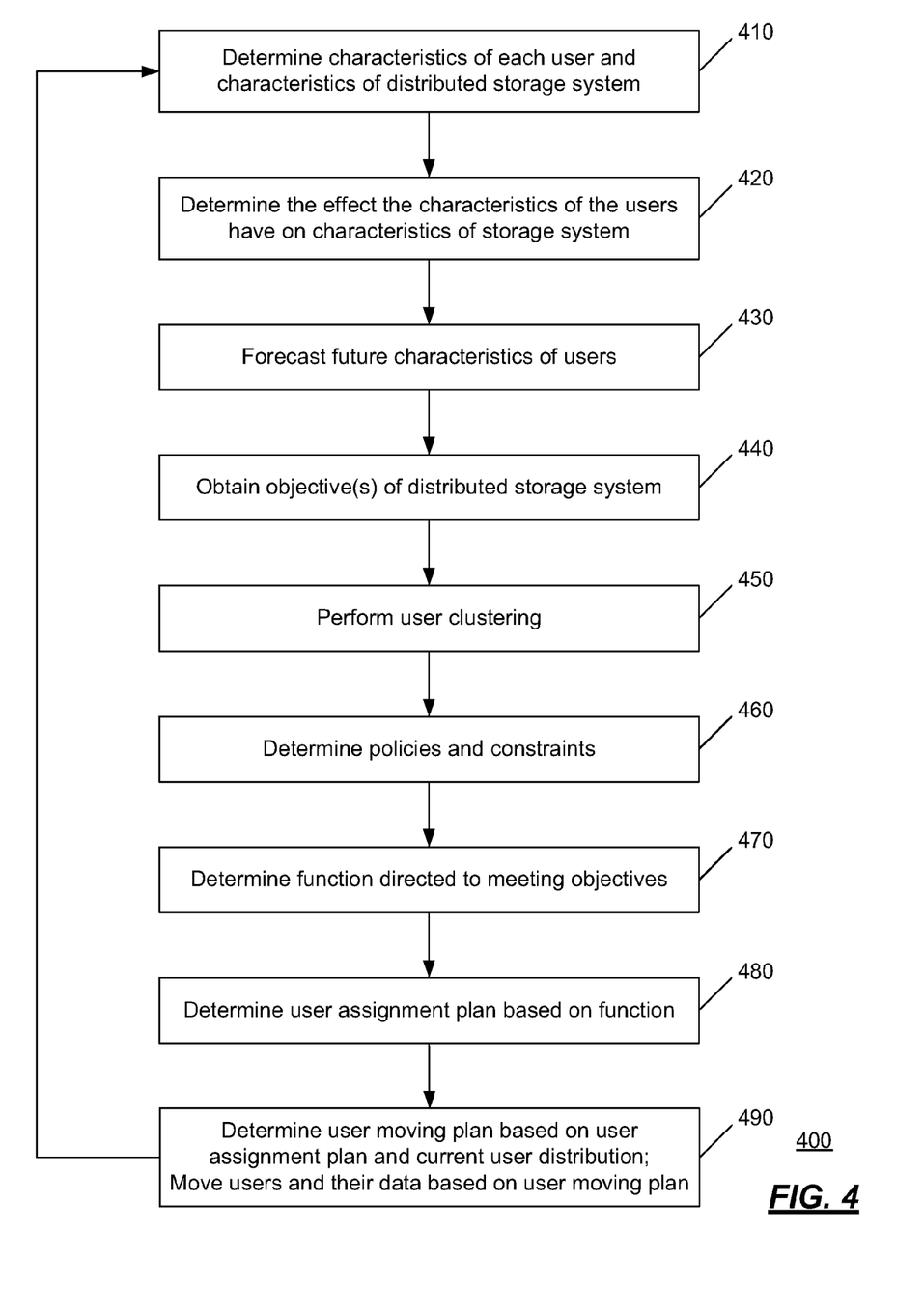
FIG. 4 is an operational flow of another implementation of a method of allocating and replicating data across a distributed storage system.

FIG. 4 is an operational flow of another implementation of a method 400 of allocating and replicating data across a distributed storage system. At 410, similar to 310 and 320, the characteristics of each user, one or more user populations, and the characteristics of the distributed storage system may be determined. In an implementation, the current user distribution may be determined. At 420, similar to 330, the effect that the characteristics of the users have on the characteristics of the distributed storage system may be determined, and at 430, similar to 340, future characteristics of the users may be forecasted.

At 440, one or more objectives of the distributed storage system may be obtained. Objectives may include performance objectives and/or capacity objectives. As described with respect to the system 200 of FIG. 2, the objectives may be obtained from storage and/or provided by a system administrator or other user, for example. In an implementation, the objectives may be to maintain a balanced storage capacity utilization and IO utilization across the servers and/or storage nodes in the distributed storage system; to accommodate the maximal number of users in each server and/or storage node with a performance threshold; and/or to maintain a minimal data loss during a multiple server or storage node outage.

At 450, user clustering may be performed to categorize the users into different clusters based on characteristics (e.g., account size, time zone, account activity, replication requirement, etc.) that impact the performance and capacity of the distributed storage system. Any clustering technique(s) may be used. In an implementation, a clustering engine such as that described with respect to the system 200 of FIG. 2 may be used.

At 460, policies and constraints of the distributed storage system may be determined. In an implementation, the policies may comprise include policies about quality of service for the users and replication of data. Users may have varying qualities of service, for example (e.g., a "premium" user may have a higher quality of service than other types of users). Regarding a replication of data policy, in an implementation, duplicated data cannot be placed in the same storage as the primary data for any user. Such policies may be translated into constraints on the distributed storage system.

Figure 5:
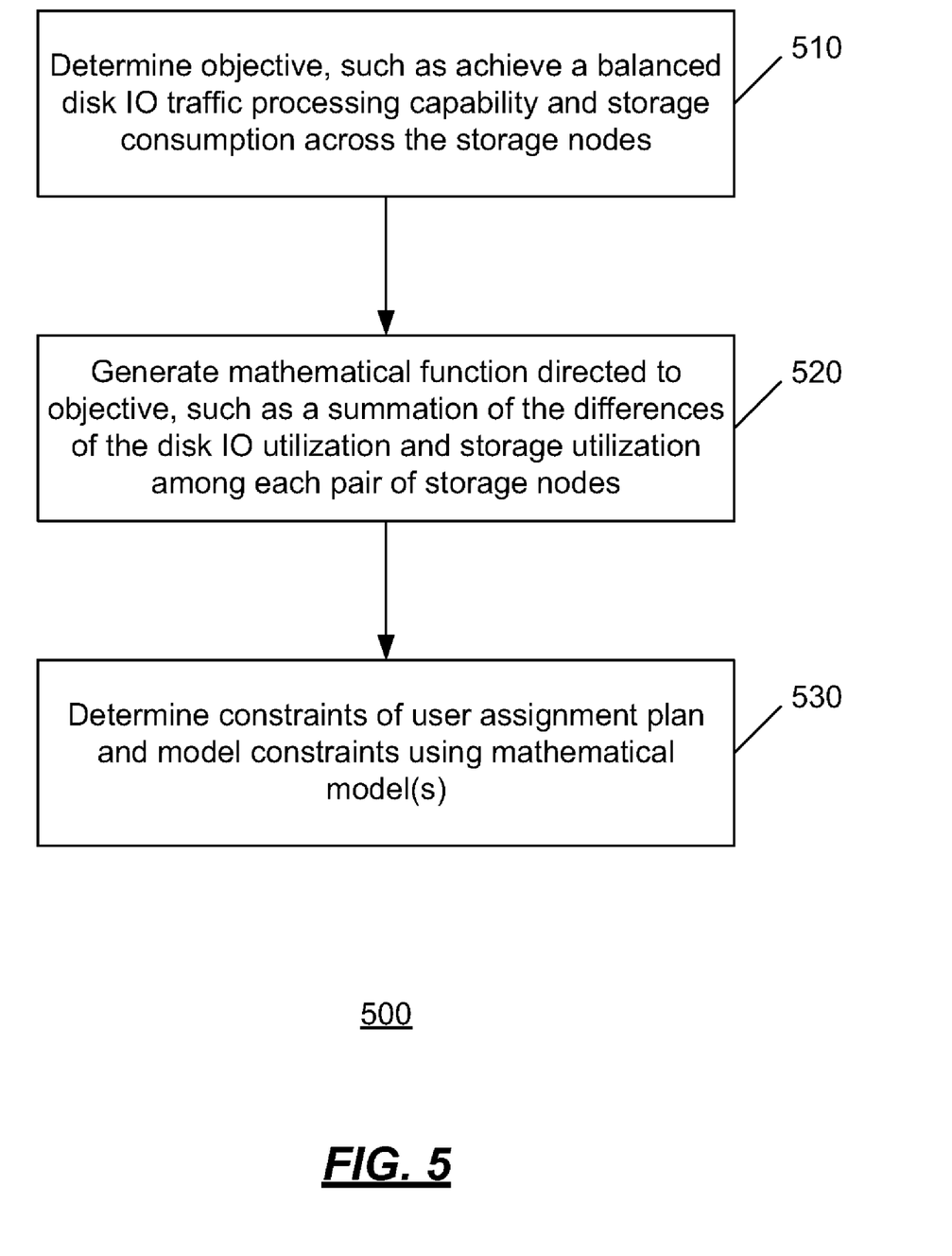
FIG. 5 is an operational flow of an implementation of a method of determining a function directed to meeting objectives and constraints that may be used with allocating and replicating data across a distributed storage system.

At 470, a function directed to meeting the objectives and constraints may be determined. In an implementation, the objectives and constraints may be formulated using a mathematical function. FIG. 5 is an operational flow of an implementation of a method 500 of determining a function directed to meeting the objectives and constraints that may be used with allocating and replicating data across a distributed storage system.

At 510, an objective may be determined or otherwise obtained. In an implementation, the objective may be to achieve a balanced disk IO traffic processing capability and storage consumption across the storage on storage nodes (e.g., servers and/or storage nodes of the system 100 in FIG. 1) in the distributed storage system. At 520, a mathematical function directed to the objective (i.e., an objective function) may be generated. In an implementation, to achieve a balanced disk IO traffic processing capability and storage consumption across the storage nodes, the function may be a summation of the differences of the disk IO utilization and the storage utilization among each pair of storage nodes. An example function may be $$\text{Minimize} \sum_{j=1}^{J-1} \left| \frac{\sum_i x_{ij} a_i}{N_j} - \frac{\sum_i x_{ij+1} a_i}{N_{j+1}} \right| + \left| \frac{\sum_i x_{ij} b_i}{S_j} - \frac{\sum_i x_{ij+1} b_i}{S_{j+1}} \right| \quad \text{(Equation 1)}$$

where $x_{ij}$ is the number of users in a cluster i that are allocated to a storage node j;

$N_j$ is the disk IO processing capability of a storage node j;

$S_j$ is the storage capacity of a storage node j;

$a_i$ is the average traffic level of the users in a cluster i;

$b_i$ is the average account size of the users in a cluster i;

$x_{ij} a_i$ is the total activity (traffic) in a storage node j, by a number of users in cluster i allocated to the storage node j;

$\Sigma_i x_{ij} a_i$ is the total activity (traffic) in a storage node j, by all users (from different clusters) allocated to the storage node j;

$$\frac{\sum_i x_{ij} a_i}{N_j}$$

is the total traffic processing capability percentage utilization in a storage node j;

$x_{ij} b_i$ is the total storage usage in a storage node j, by a number of users in cluster i allocated to the storage node j;

$\Sigma_i x_{ij} b_i$ is the total storage usage in a storage node j, by all users (from different clusters) allocated to the storage node j; and $$\frac{\sum_i x_{ij} b_i}{S_j}$$

is the total storage capacity percentage utilization in a storage node j.

The function may be minimized such that Equation 1 may minimize the total traffic difference (e.g., in percentage of the total traffic processing capability) and the storage consumption difference (e.g., in percentage of the total storage capacity) among the storage nodes. Absolute values may be used to accumulate the net differences and avoid an offsetting of the positive and negative differences.

At 530, constraints that may be used with respect to a user assignment plan (e.g., to be subsequently generated) may be determined and may be modeled using mathematical function(s). For example, a constraint directed to the total user data assigned to a storage node being less than the storage capacity of the node can be represented as $\Sigma_i A_i \leq S$, where $A_i$ represents the account data of user i on this storage node and S denotes the total storage capacity of the node. In an implementation, constraints may include:

$$\Sigma_j X_{ij} = M_i \, \forall i \quad \text{(Equation 2)}$$

$$\Sigma_i X_{ij} a_i \leq N_j \, \forall j \quad \text{(Equation 3)}$$

$$\Sigma_i X_{ij} b_i \leq S_j \, \forall j \quad \text{(Equation 4)}$$

where $X_{ij}$ is an integer and represents the number of users in a cluster i that are allocated to a storage node j, while $M_i$ is the total numbers of users in a cluster i.

Equation 2 states that the total cluster i users allocated to the storage nodes is equal to the number of total cluster i users. Equation 3 states that the total traffic generated by the users allocated to a storage node j should be less than the total disk IO traffic processing capability of the storage node j. Equation 4 states that the total storage consumption by the users allocated to a storage node j should be less than the total storage capacity of the storage node j.

In an implementation, rebalancing of the objective function may be formulated as a minimum path problem in order to determine the minimum number of user moves to re-balance the users and their data among the storage nodes and to achieve a balanced allocation.

At 480, a user assignment plan may be determined by solving the function determined at 470. Any well known technique may be used to solve the function. In an implementation, heuristic algorithms may be used to solve the function, such as greedy algorithms, genetic algorithms, or simulated annealing, as may exact algorithms such as branch-and-bound and branch-and-cut algorithms. In an implementation, clusters of users (as opposed to individual users) may be used in the function and the solving of the function.

At 490, a user moving plan may be determined based on the user assignment plan and the current user distribution. The user moving plan may be implemented (e.g., using replication techniques), thereby moving the users and their data. A user moving plan may minimize the number of moves to get to a new optimum allocation of data pertaining to the users. The distance between the current location of the data and the destination location for the data pertaining to the users may be analyzed with the objective to minimize the user moving procedures (or minimize the transportation or replication cost or any other appropriate functions) to move the data from the current location to the destination location. The analysis may be formulated and solved in a mathematical way.

Figure 6:
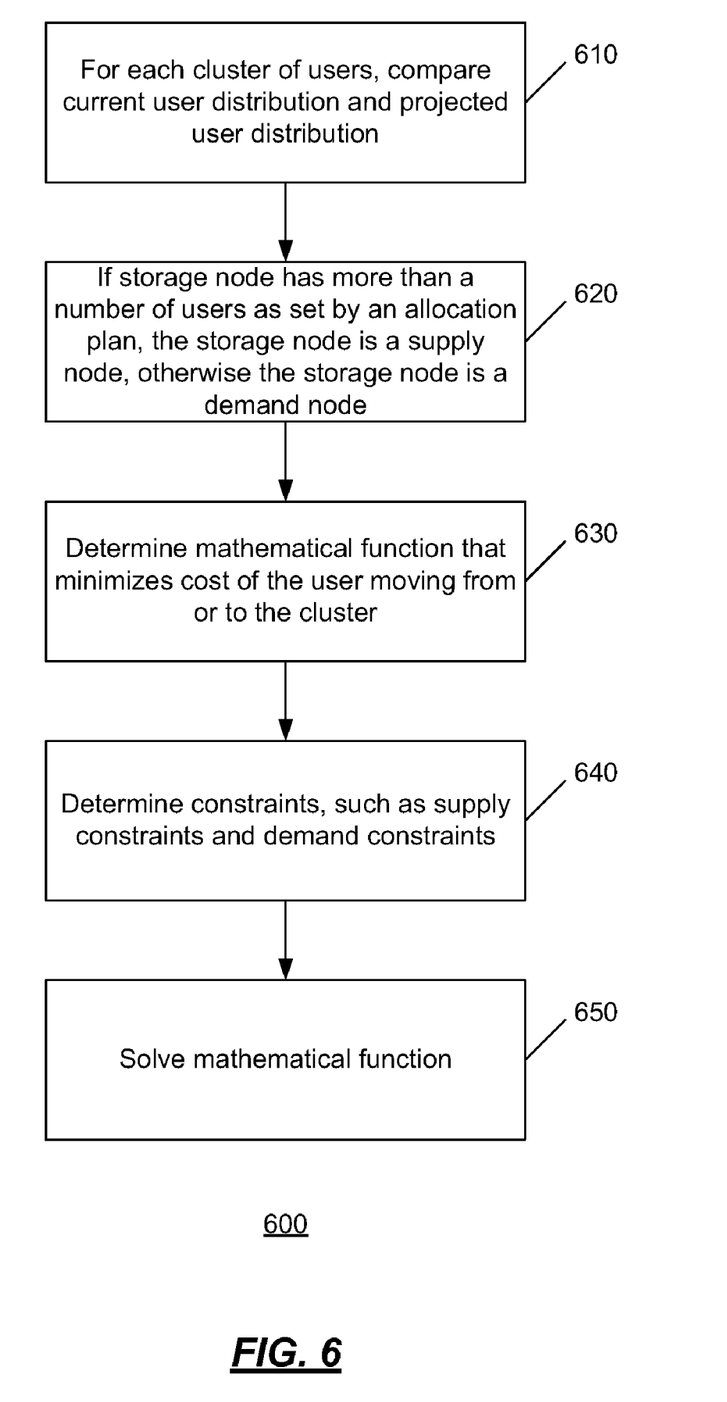
FIG. 6 is an operational flow of an implementation of a method of determining a user moving plan that may be used with allocating and replicating data across a distributed storage system.

FIG. 6 is an operational flow of an implementation of a method 600 of determining a user moving plan that may be used with allocating and replicating data across a distributed storage system. At 610, for each cluster of users, the current user distribution and projected user distribution in each storage node may be compared. If the storage node has more than a number of users as set by the allocation plan, it is determined at 620 that the storage node is a supply node and is to provide a number of users and their data to balance the allocation of users and their data. If the storage has less than the number of users, it is determined that the storage node is a demand node and is to receive a number of users and their data to balance the allocation of users and their data.

At 630, a mathematical function may be determined that minimizes the cost of the user (and their data) moving from or to a cluster. In an implementation, if $x_{ij}$ denotes the number of users (a decision variable) in a certain cluster moved from supply node i to demand point j, then the formulation of problem (minimizing the cost of the user moving for this cluster) is $$\text{Minimize} \sum_{i=1}^{m} \sum_{j=1}^{n} c_{ij} x_{ij} \quad \text{(Equation 5)}$$

where $c_{ij}$ is the cost to move a user from a node i to a node j, and it can be understood as the time and/or the distance to move the user from i to j. $x_{ij}$ is a binary variable (i=1, 2, ..., m; j=1, 2, ..., n). It is equal to 1 if the user will be moved from i to j; it is equal to 0 otherwise, and m is the number of supply nodes and n is the number of demand nodes.

At 640, constraints may be determined, such as supply constraints:

$$\sum_{j=1}^{n} x_{ij} = s_i \ (i = 1, 2, \ldots, m) \quad \text{(Equation 6)}$$

and
demand constraints:

$$\sum_{i=1}^{m} x_{ij} = d_j \ (j = 1, 2, \ldots, n) \quad \text{(Equation 7)}$$

where $s_i$ is the number of users that the storage node i can supply and $d_j$ is the number of users that the storage node j is to receive.

The constraints in Equation 6 are directed to the number of users a supply storage node i can give out and may be determined by obtaining the difference of the current user distribution and the projected user distribution. The constraints in Equation 7 describe the number of users a demand storage node is to receive. At 650, the function may be solved using any known technique(s).

After the users and their data are moved based on the user moving plan, processing may continue at 410 as data pertaining to users and the distributed storage system may change and new users may be added to the distributed storage system.

Figure 7:
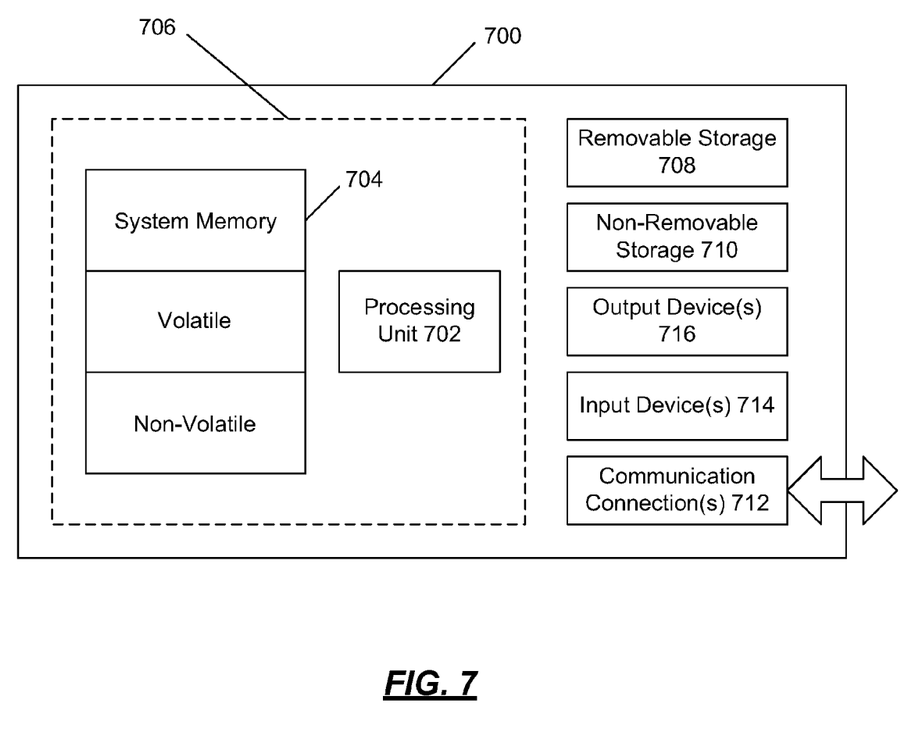
FIG. 7 shows an exemplary computing environment.

FIG. 7 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by device 700 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

Computing device 700 may be one of a plurality of computing devices 700 inter-connected by a network. As may be appreciated, the network may be any appropriate network, each computing device 700 may be connected thereto by way of communication connection(s) 712 in any appropriate manner, and each computing device 700 may communicate with one or more of the other computing devices 700 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A data allocation and replication method, comprising:
    determining a plurality of characteristics of each user of a distributed storage system comprising a plurality of storage nodes, each user having data stored on the distributed storage system;
    determining a plurality of characteristics of the distributed storage system;
    correlating the characteristics of each user with the characteristics of the distributed storage system to determine an effect that each of the characteristics of each user has on the characteristics of the distributed storage system;
    for each user, categorizing the user into one of a plurality of different clusters based on the characteristics of the user and the determined effect that each of the characteristics of the user has on the characteristics of the distributed system;
    determining a user assignment plan mapping each user to one or more storage nodes within the distributed storage system based on the clusters and the effect that each of the characteristics of each user has on the characteristics of the distributed storage system; and
    moving the users and the data based on the user assignment plan.

2. The method of claim 1, further comprising forecasting a plurality of future characteristics of the users, wherein the user assignment plan is further based on the future characteristics of the users that are forecasted.

3. The method of claim 1, further comprising:
    determining a current user distribution of the users on the distributed storage system; and
    determining a user moving plan based on the current user distribution and the user assignment plan, wherein moving the users and the data is based on the user moving plan.

4. The method of claim 1, wherein the characteristics of each user comprise an account size, an account size growth rate, an average daily traffic generation, a dynamic daily traffic generation, and a registration date.

5. The method of claim 1, wherein the characteristics of the distributed storage system comprise a performance and a capacity of the each of the storage nodes of the distributed storage system.

6. The method of claim 1, further comprising:
    obtaining an objective of the distributed storage system; and
    determining a function directed to meeting the objective, wherein the user assignment plan is further based on the function directed to meeting the objective.

7. The method of claim 6, further comprising determining a plurality of constraints regarding the distributed storage system, wherein the function is further directed to meeting the constraints.

8. The method of claim 7, wherein the constraints comprise a quality of service policy and a replication of data policy.

9. The method of claim 6, wherein the function is based on the plurality of clusters.

10. The method of claim 6, wherein the objective comprises an objective to achieve a balanced disk input/output traffic processing capability and storage consumption across the storage nodes or an objective to achieve a predetermined disk input/output traffic processing capability and storage consumption across the storage nodes.

11. The method of claim 10, wherein the function comprises a summation of differences of disk input/output utilization and storage utilization among a plurality of pairs of the storage nodes.

12. The method of claim 1, wherein moving the users and the data comprises determining a minimum number of moves of the users and the data to balance the storage nodes and to achieve a balanced allocation of the users and the data.

13. A data allocation and replication system, comprising:
a characteristic analyzer and correlator that determines a plurality of characteristics of each user of a distributed storage system, a plurality of characteristics of the distributed storage system, and correlates the characteristics of each user with the characteristics of the distributed system to determine an effect that each of the characteristics of each user has on the characteristics of the distributed storage system;
a clustering engine that, for each user, categorizes the user into one of a plurality of different clusters based on the determined characteristics of the user and the determined effect that each of the characteristics of the user has on the characteristics of the distributed system; and
a user allocation engine that determines a user assignment plan mapping each user to one of a plurality of storage nodes in the distributed storage system based on the clusters and the effect that each of the characteristics of each user has on the characteristics of the distributed storage system, and moves the users and data of the users based on the user assignment plan.

14. The system of claim 13, further comprising a characteristic forecaster that forecasts a plurality of future characteristics of the users, wherein the user assignment plan is further based on the future characteristics of the users.

15. The system of claim 13, further comprising an objective determiner that obtains an objective of the distributed storage system, the user assignment plan based on a function directed to meeting the objective.

16. The system of claim 15, wherein the function is based on the plurality of clusters.

17. The system of claim 15, wherein the objective comprises an objective to achieve a balanced disk input/output traffic processing capability and storage consumption across the storage nodes, and wherein the function comprises a summation of differences of disk input/output utilization and storage utilization among a plurality of pairs of the storage nodes.

18. A system comprising:
a distributed storage system comprising a plurality of storage nodes;
a data engine that determines a plurality of characteristics of each of a plurality of users and a plurality of characteristics of the distributed storage system;
a correlator that correlates the characteristics of each user with the characteristics of the distributed system to determine an effect that each of the characteristics of each user has on the characteristics of the distributed storage system;
a clustering engine for categorizing each user of the plurality of users into one of a plurality of different clusters based on characteristics of the user and the determined effect that each of the characteristics of the user has on the characteristics of the distributed system;
a web service comprising the plurality of users allocated among the storage nodes; and
an allocation and replication system in communication with the distributed system and the web service via a communications network, the allocation and replication system dynamically monitoring and balancing an allocation of the users across the storage nodes.

19. The system of claim 18, wherein the allocation of the users being balanced based on the characteristics of each user and the characteristics of the distributed storage system.

20. The system of claim 19, wherein the characteristics of each user comprise at least one of an account size, an account size growth rate, an average daily traffic generation, a dynamic daily traffic generation pattern, or a registration date, and wherein the characteristics of the distributed storage system comprise at least one of a performance or a capacity of the distributed storage system.

* * * * *